UNITED STATES PATENT OFFICE.

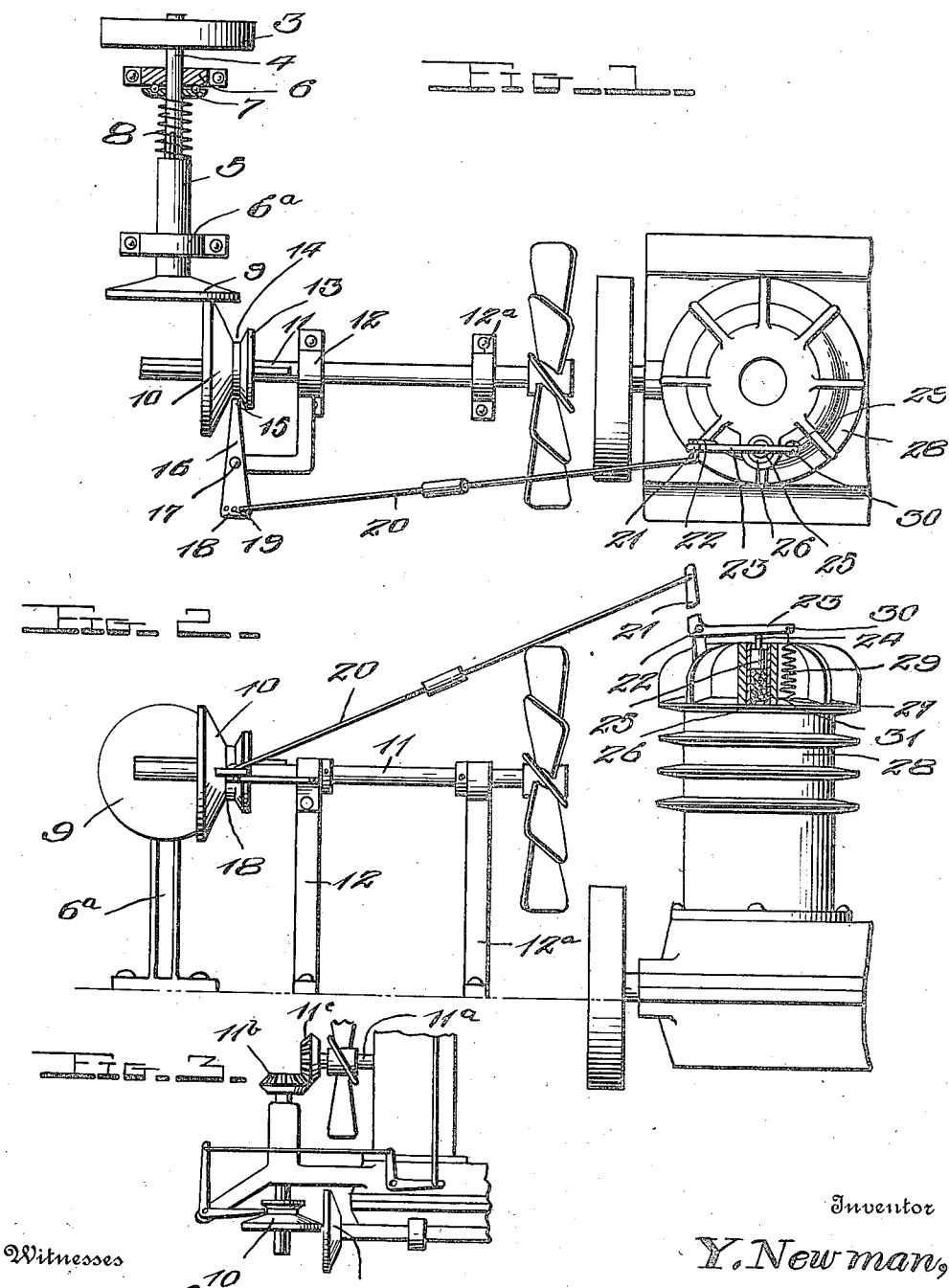

YORGEN NEWMAN, OF MONROE, UTAH.

ENGINE-COOLING DEVICE.

1,043,344.      Specification of Letters Patent.      Patented Nov. 5, 1912.

Application filed April 8, 1912. Serial No. 689,273.

*To all whom it may concern:*

Be it known that I, YORGEN NEWMAN, a citizen of the United States, residing at Monroe, in the county of Sevier and State of Utah, have invented certain new and useful Improvements in Engine-Cooling Devices, of which the following is a specification, reference being had to the accompanying drawings.

This invention relates to an improvement in air cooling devices for internal combustion engines and has for its object the provision of means whereby the blast of air directed upon the engine is directly controlled by variations in the heat in the engine cylinder so that at the time of starting the temperature of the engine is allowed to rise to ideal working conditions and maintained at such temperature by an air blast which is automatically brought into play and the violence of which is directly proportioned to variations in the temperature of the engine.

The invention also aims to accomplish the object previously stated by means of mechanism simple of construction and not liable to get out of order and wholly automatic and accurate in its operation.

The invention as thus outlined and as hereinafter particularly claimed will be readily understood from the following description taken in connection with the accompanying illustrative drawings, wherein—

Figure 1 is a top plan view; Fig. 2 is a side elevation; and Fig. 3 is a fragmentary view of a modification.

Corresponding and like parts are referred to in the following description and designated in the accompanying drawings by like reference characters.

The reference numeral 1 designates a conventional showing of the cylinder of an internal combustion engine and the reference numeral 2 designates a fan arranged in operative position to direct the blast of air upon the cylinder to cool the same.

A drive pulley 3 for the air cooling device which is connected in any suitable manner to the engine and driven thereby is mounted upon the driving shaft comprising the two telescopic members 4 and 5 which are slidably mounted one with reference to the other against relative rotation. The drive shaft is journaled in bearings 6 and 6ᵃ and preferably runs upon ordinary ball bearings, not shown. Upon the side face of the bearing 6 is provided a ball race and an outer bearing cap constituting a thrust bearing 7 for the compression spring 8 mounted upon the inner member 4 of the telescopic shaft and bearing against the end face of the outer member 5. Upon the opposite end of the drive shaft is a friction disk 9 of the usual type upon the flat face of which travels the periphery of a friction wheel 10 splined upon the fan shaft 11 for longitudinal non-rotary movement thereon. The fan shaft 11 is mounted to rotate freely in the bearings 12 and 12ᵃ and carries upon its opposite end the fan 2.

The friction wheel 10 has upon one face a projecting boss 13 between which and the wheel face is provided an annular groove 14 within which travels the end 15 of a shift lever 16 which is fulcrumed at 17 and has its opposite end 18 provided with a plurality of holes 19 within which is adjustably connected one end of a connecting rod 20 the opposite end of which is connected to one arm 21 of a bell crank lever fulcrumed at 22 and having its other arm 23 connected to the stem 24 of a piston 25 snugly fitting within a tube 26 which contains between the piston and its closed bottom end a quantity of mercury 27. The tube 26 is suitably mounted within the wall of the engine cylinder at 28 whereby it is exposed to variations of temperature in the engine.

The piston is driven outwardly by the expansion of the mercury 27 under the influence of the rising temperature and is returned into the tube as the temperature lowers and the mercury contracts by means of a spring 29 connected to the arm of the lever at 30 and to a suitable support 31.

The operation of the device will be apparent. When the engine is first started up and everything is cold the friction wheel 10 will occupy a position coincident with the axis of the friction disk 9 and consequently will not be rotated thereby. In this way the temperature of the engine will be permitted to rise speedily to that at which the best results are obtained. When such temperature is reached it is not necessary for the one in charge to switch the fan into operation as is usually required where the fan is not run constantly, but the rising temperature of the cylinder acting upon the mercury within the tube 26 causes the same to expand and drive the piston outwardly, thus shifting the arms 21 and 23 of the bell crank lever, and through the rod 20 and the lever 16, shifting the friction wheel 10 upon the fan shaft 11 radially of the friction disk 9 thereby causing the same together with the fan 2 to be driven by the said constantly rotating disk. If the temperature continues to rise the friction wheel 10 is further shifted radially of the disk 9 so as to increase the speed of the fan 2 and if on the contrary the temperature lowers the wheel 10 is shifted in the opposite direction toward the axis of the disk 9 and the speed of the fan is decreased.

Obviously, instead of the fan being mounted directly upon the shaft 11 it may be mounted upon a separate stub shaft 11$^a$ arranged at an angle to the shaft 11 and driven thereby through the intermediary of pinions 11$^b$ and 11$^c$, the constructions being equivalent.

It will thus be seen that in a very efficient manner the air current directed upon the engine cylinder is automatically controlled to correspond to variations in the temperature of the cylinder so as to maintain the latter practically constant.

Having thus described the invention what is claimed is:

1. The combination, with an internal combustion engine, of a thermostatic device exposed to the heat of the engine, a fan driven by the engine to direct a current of air upon the same, and means to regulate the speed of the fan independent of the engine speed, said means including a connection between said regulating means and the thermostatic device whereby to vary the speed of the fan independently of that of the engine to correspond to the temperature of the engine.

2. The combination, with an internal combustion engine, of a thermostatic device exposed to the heat of the engine, a fan to direct a current of air upon the engine, a friction disk driven by the engine, a friction wheel bearing upon the disk and adjustable radially thereof, a shaft connecting the friction wheel and the fan, a shifting lever bearing upon the friction wheel, and a connection between the shifting lever and the thermostatic device whereby to shift the friction wheel and thus vary the speed of the fan independently of that of the engine to correspond to the temperature of the engine.

3. The combination, with an internal combustion engine, of a tube exposed to the heat of the engine and containing a heat sensitive liquid, and a piston bearing upon the liquid contents of the tube, a fan to direct a current of air upon the engine, a friction disk driven at a speed varying with the speed of the engine, a friction wheel bearing upon the friction disk and shiftable radially thereof, a shaft driven by the friction wheel and serving to drive the fan, a shifting lever arranged to act upon the friction wheel, a lever connected to the piston of the thermostatic device, and a connection between the two levers whereby to vary the speed of the fan independently of that of the engine to correspond to the temperature of the engine.

4. The combination, with an internal combustion engine, of a thermostatic device comprising a tube housed within the wall of the engine cylinder and containing a body of mercury, a piston within said tube having its face exposed to the mercury, a stem projecting from the piston beyond the end of the tube, a fan to direct a cooling current of air upon the engine, a drive shaft comprising telescopic members driven from the engine at a speed varying with the speed of the engine, a friction disk carried by one of the shaft members and having a plane outer face, a friction wheel bearing with its periphery upon the plane face of the disk, a spring mounted upon the shaft to press the disk outwardly against the wheel, a fan shaft having mounted upon its opposite ends the fan and the friction disk, the friction wheel longitudinally movable upon the fan shaft to shift its bearing upon the disk radially of said disk, a boss on the friction wheel, an annular groove about said boss, a lever having one of its arms engaged in said groove and its other arm provided with a series of holes, a bell crank lever having one of its arms connected to the stem of the piston, and a connecting rod having one end attached to the other arm of the bell crank lever and its other end engaged in one of the holes in the end of the shifting lever whereby an increase in temperature of the engine cylinder will shift the bell crank lever and thereby shift the friction wheel toward the periphery of the disk to increase the speed of the fan, a retractile spring connected to the bell crank lever to return the piston within the tube as the temperature lowers and to shift the friction wheel toward the center of the disk to reduce the speed of the fan.

In testimony whereof I hereunto affix my signature in the presence of two witnesses.

YORGEN NEWMAN.

Witnesses:
 HEBER SWINDLE,
 CHRISTIAN ANDERSEN.